US012616335B2

(12) United States Patent
Zhang et al.

(10) Patent No.: US 12,616,335 B2
(45) Date of Patent: May 5, 2026

(54) LIFTING MULTIFUNCTIONAL AIR FRYER

(71) Applicant: NINGBO CARELINE ELECTRIC APPLIANCE CO., LTD., Ningbo (CN)

(72) Inventors: Yichi Zhang, Ningbo (CN); Huayuan Pan, Ningbo (CN); Rongjie Bai, Ningbo (CN); Jiahe Liang, Ningbo (CN)

(73) Assignee: NINGBO CARELINE ELECTRIC APPLIANCE CO., LTD., Zhejiang (CN)

( * ) Notice: Subject to any disclaimer, the term of this patent is extended or adjusted under 35 U.S.C. 154(b) by 780 days.

(21) Appl. No.: 18/097,853

(22) Filed: Jan. 17, 2023

(65) Prior Publication Data

US 2023/0225554 A1     Jul. 20, 2023

(30) Foreign Application Priority Data

Jan. 20, 2022    (CN) .......................... 202220146551.9

(51) Int. Cl.
*A47J 37/06*      (2006.01)
*A47J 36/32*      (2006.01)

(52) U.S. Cl.
CPC ........... *A47J 37/0641* (2013.01); *A47J 36/32* (2013.01)

(58) Field of Classification Search
CPC ..... A47J 37/0641; A47J 37/1276; A47J 36/32
See application file for complete search history.

(56) References Cited

U.S. PATENT DOCUMENTS

2022/0338672 A1* 10/2022 Yang .................... A47J 37/0641
2025/0024992 A1* 1/2025 Zhang ................. A47J 37/0641
2025/0064258 A1* 2/2025 Xu ....................... A47J 37/0641

* cited by examiner

*Primary Examiner* — Rodolphe Andre Chabreyrie
(74) *Attorney, Agent, or Firm* — Hogan Lovells US LLP

(57) ABSTRACT

Provided is lifting multifunctional air fryer, including machine body, cookware and lifting drive component, wherein the cookware includes at least frying basket and frying pan, and the machine body includes machine head, base, and side plate arranged between the machine head and the base, to define first cooking chamber for accommodating the frying basket and second cooking chamber for accommodating the frying pan. Air frying module is arranged above the first cooking chamber, and the air frying module communicates the inner chamber of frying basket; first heating element is arranged above the second cooking chamber, and second heating element is arranged below, both of them are connected to the frying pan; the first heating element is driven by the lifting drive component to lift, so that the height between the first heating element and the second heating element is adapted to that of ingredients on the frying pan.

15 Claims, 3 Drawing Sheets

1

LIFTING MULTIFUNCTIONAL AIR FRYER

CROSS-REFERENCE TO RELATED APPLICATION

The present disclosure claims the priority to the Chinese patent application filed with the Chinese Patent Office on Jan. 20, 2022 with the filing No. CN 2022201465519, and entitled "Lifting Multifunctional Air Fryer", the contents of which are incorporated herein by reference in entirety.

TECHNICAL FIELD

The present disclosure relates to the technical field of kitchen appliances, in particular to a lifting multifunctional air fryer.

BACKGROUND ART

The air fryer guides the hot air to flow quickly over the surface of the food, so as to form a crispy surface of the food, thereby achieving a cooking taste similar to deep fried food. At present, the existing air fryers have a single function, and can only fry ingredients by air, such as fried chicken and fries, which are unable to cook ingredients with multiple tastes.

In order to meet a variety of use requirements, some multifunctional air fryers have also appeared. For example, the patent application with the filing number CN202022544512.8 discloses a multifunctional air fryer, which comprises: a lower body, which is equipped with a lower thermal-radiation heating component inside; an upper body, which is equipped with a hot air convection component inside, wherein the upper body can be fitted with or separated from the lower body, when the upper body and the lower body are matched with each other, an air frying chamber can be formed, and the lower thermal-radiation heating component cooperates with the hot air convection component to perform air frying to the ingredients in the air frying chamber; and when the upper body is separated from the lower body, the upper body can keep away from the top of the lower body, so that the lower body provides a cooking chamber with an opening facing upward; and a cooking utensil, which can be arranged in the air frying chamber or the cooking chamber, and is used for accommodating ingredients to be cooked. Although the air fryer can realize the function of frying and grilling, it can only grill one side of the ingredients and can only cook the ingredients in one way, rather than air frying one while grilling another one, thereby lowering the cooking efficiency.

SUMMARY

The present disclosure provides a lifting multifunctional air fryer to solve the problem that the existing multifunctional air fryer can only grill one side of the ingredients and cannot cooking different ingredients at the same time.

In order to solve the above-mentioned technical problems, the present disclosure provides a lifting multifunctional air fryer, the air fryer comprises:

a cookware, including at least one frying basket and at least one frying pan;

a machine body, including a machine head, a base, and a side plate, wherein the side plate is arranged between the machine head and the base, and defines a first cooking chamber for accommodating the frying basket and a second cooking chamber for accommodating the frying pan, an air frying module is provided above the first cooking chamber, the air frying module communicates with the inner chamber of the frying basket, a first heating element is provided above the second cooking chamber, a second heating element is provided below the second cooking chamber, and the first heating element and the second heating element are both connected to the frying pan; and a lifting drive component, configured to actuate the first heating element to carry out lifting movement, so as to enable the height between the first heating element and the second heating element to match the height of the ingredient on the frying pan.

In an optional embodiment, the first heating element is a heating plate, and the heating plate includes a plate body and electrical heated tubes set in the plate body. In this embodiment, a heating plate is used as the first heating element, which has a simple structure and is easy to assemble and clean.

In an optional embodiment, the lifting drive component includes a drive motor, a gear sleeved on the output shaft of the drive motor, and a rack meshed with the gear, the rack is vertically arranged and connected to the first heating element. In this embodiment, the gear-rack transmission mechanism is used to convert the high-speed rotation of the drive motor into the low-speed linear movement of the rack. In this way, the lifting drive component can smoothly drive the first heating element to carry out the lifting movement, which can prevent the first heating element from being unstable during the lifting process due to the excessively fast speed.

In an optional embodiment, the air fryer also includes:

a safety switch, which is arranged in the machine head, including an ascending switch and a descending switch;

a rotary handle, which is rotatably connected to the machine head, the inner end of the rotary handle is provided with a trigger part, and the trigger part is in linkage with the safety switch; and a controller, which is arranged in the machine head and electrically connected with the safety switch and the drive motor, wherein the rotary handle is rotated with at least a first position and a second position, when the rotary handle is rotated to the first position, the trigger part triggers the ascending switch to control the first heating element to rise; and when the rotary handle is rotated to the second position, the trigger part triggers the descending switch to control the first heating element to go down. In the present disclosure, the rotary handle is used to control the lifting of the first heating element, so as to simplify the operation, avoid maloperation and improve user experience.

In an optional embodiment, a limiting part is provided on the rack. In this embodiment, the setting of the limiting part makes the movement of the rack within a controllable range, and prevents the rack from being disengaged with the gear while moving up and down.

In an optional embodiment, a third heating element is provided in the base, and the third heating element is located below the first cooking chamber and is arranged correspondingly to the bottom of the frying basket. The setting of the third heating element in this embodiment, on the one hand, can improve the hot air circulation in the frying basket to increase the heating efficiency, and allow the food to be heated more evenly on the other hand, it can expand the working mode of the air fryer.

In an optional embodiment, the frying basket includes a bottom plate and a vertical plate arranged around the bottom plate, the bottom plate and the vertical plate are integrally formed to form a receiving chamber with an open top, when the frying basket is placed in the first cooking chamber, part region of the vertical plate is surrounded by side plates, and the remaining region is directly exposed to the external environment. In this embodiment, the air fryer is in an open structure, the frying basket is directly communicated to the external environment, and the side wall of the frying basket has no cold air circulation structure such as lower core, shell, etc. On the one hand, the material cost and the assembly cost of the frying basket are saved, thereby reducing the production cost of the air fryer; on the other hand, it is convenient to clean the machine head and frying basket.

In an optional embodiment, the projected length of the side plate on the base is not greater than half of the perimeter of the base. In the present disclosure, the cookware can be put inside and outside the first cooking chamber and the second cooking chamber from various angles on the side surfaces of the air fryer while in the prior art the cookware can only be put in from the front, which improves the user experience and aesthetic of the air fryer. At the same time, since most part of the vertical plate is exposed, the heat dissipation effect of the frying basket is improved.

In an optional embodiment, when the frying basket is placed in the first cooking chamber, there are steam outlets between the vertical plate and the machine head. In this embodiment, there is no need to provide steam outlet on the side surface of the machine head, which simplifies the structure of the air fryer and improves the aesthetics of the air fryer.

In an optional embodiment, the frying basket further includes a pot lid that is covered on the vertical plate, and the inner wall of the vertical plate is provided with a step surface, and the step surface is selectively equipped with a steaming plate or a frying pan. In this embodiment, the frying basket can not only fry food, but also can steam food, which can be used for multiple purposes, and has very good practicability.

Compared with prior art, the beneficial effect of the present disclosure is as follows.

The present disclosure designs the structure of the air fryer. By configuring the first cooking chamber, the second cooking chamber, the air frying module, the second heating element, the frying basket and the frying pan, the air fryer can fry and deeply fry the food at the same time, so as to meet the users' different cooking needs. By configuring the first heating element and the lifting drive component, the lifting drive component actuate the first heating element to move up and down, so that the air fryer can fry food with different thicknesses on both sides, achieving a more efficient and delicious frying effect.

Figure 1:
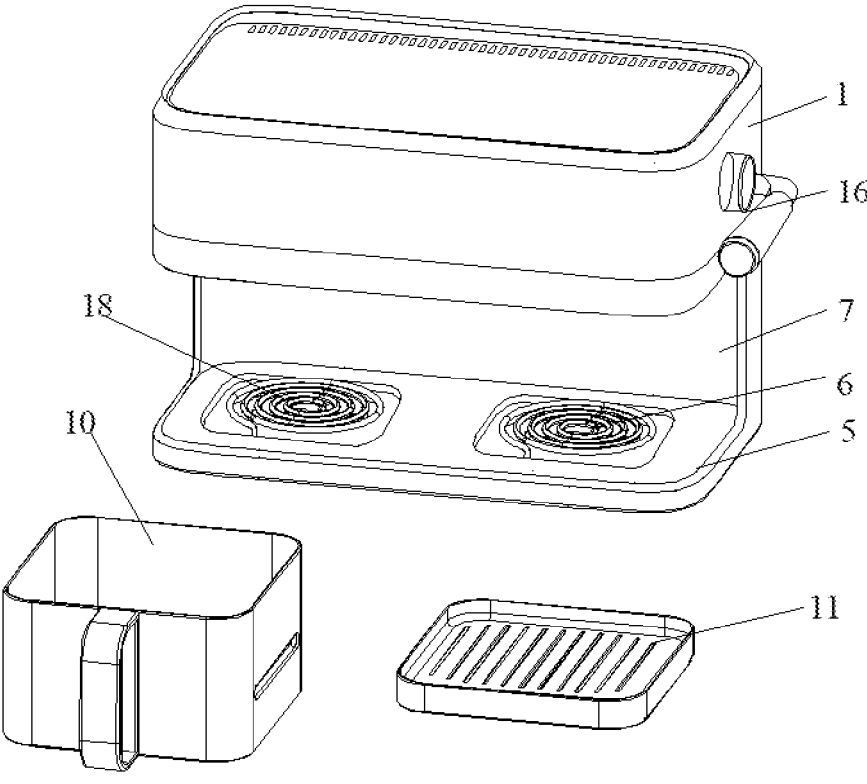
FIG. 1 is a schematic structural view of a lifting multifunctional air fryer according to an example of the present disclosure.

EXPLANATION OF REFERENCE SIGNS 1, machine head; 2, air frying module; 201, rotating motor; 202, cooling fan; 203, air duct plate; 204, thermal circulation fan; 205, heating tube; 3, first heating element; 4, partition plate; 5, base; 6, second heating element; 7, side plate; 8, first cooking chamber; 9, second cooking chamber; 10, frying basket; 101, bottom plate; 102, vertical plate; 103, pot lid; 104, step surface; 11, frying pan; 12, drive motor; 13, gear; 14, rack; 15, safety switch; 151, ascending switch; 152, descending switch; 16, rotary handle; 17, trigger part; 18, third heating element; 19, steam outlet.

DETAILED DESCRIPTION OF EMBODIMENTS

In order to exhibit the above-mentioned objects, features and advantages of the present disclosure more obvious and understandable, the present disclosure will be further described in detail below with reference to the accompanying drawings and specific embodiments.

Referring to FIG. 1 to FIG. 4, the present disclosure shows a lifting multifunctional air fryer, which comprises a machine body, a cookware and a lifting drive component, wherein the cookware at least includes a frying basket 10 and a frying pan 11. The machine body includes a machine head 1, a base 5, and a side plate 7. The side plate 7 is arranged between the machine head 1 and the base 5, and defines a first cooking chamber 8 for accommodating a frying basket 10 and a second cooking chamber 9 for accommodating a frying pan 11. Herein, an air frying module 2 is arranged above the first cooking chamber 8, and the air frying module 2 is communicated with the inner chamber of the frying basket 10; and the first heating element 3 is arranged above the second cooking chamber 9 and the second heating element 6 is arranged below the second cooking chamber 9, and both the first heating element 3 and the second heating element 6 are connected to the frying pan 11. The first heating element 3 is driven by the lifting drive component to move up and down, so that the height between the first heating element 3 and the second heating element 6 matches the height of the ingredients on the frying pan 11.

Specifically, a partition plate 4 is provided inside the machine head 1 to divide the machine head 1 into a first installation chamber and a second installation chamber, and the air frying module 2 is located in the first installation chamber and above the first cooking chamber 8; the first heating element 3 and the lifting drive component are located in the second installation chamber and above the second cooking chamber 9; and the second heating element 6 is located in the base 5 and is arranged oppositely to the first heating element 3. The air frying module 2, the first heating element 3, the second heating element 6 and the lifting drive component are respectively electrically connected to the controller. Specifically, from top to bottom, the air frying module 2 includes a rotating motor 201, a cooling fan 202, an air duct plate 203, a thermal circulation fan 204, and a heating tube 205 in sequence, and the cooling fan 202 and the thermal circulation fan 204 are both sleeved on the output shaft of rotating motor 201; and the air duct plate 203 divides the first installation chamber into a heat dissipation chamber and a heating chamber, and the heating chamber communicates with the first cooking chamber 8. The first heating element 3 and the second heating element 6 are selected from any one of heating plate, heating tube, coil disk, and heating film.

When cooking, the frying basket 10 can be placed in the first cooking chamber 8, and the frying pan 11 can be placed in the second cooking chamber 9, such that the food can be deeply fried and fried at the same time. When frying food, the height of the first heating element 3 can be adjusted through the lifting drive component to adapt to food with different heights and realize double-sided frying. The air frying module 2, the first heating element 3 and the second heating element 6 can work simultaneously or independently. The present disclosure designs the structure of the air fryer. By configuring the first cooking chamber 8, the second cooking chamber 9, the air frying module 2, the second heating element 6, the frying basket 10 and the frying pan 11, the air fryer can simultaneously deeply fry and fry the food to meet users' different cooking needs. By configuring the first heating element 3 and the lifting drive component, the lifting drive component actuates the first heating element 3 to move up and down, so that the air fryer can fry food with different thicknesses on both sides, achieving a more efficient and delicious frying effect.

Figure 2:
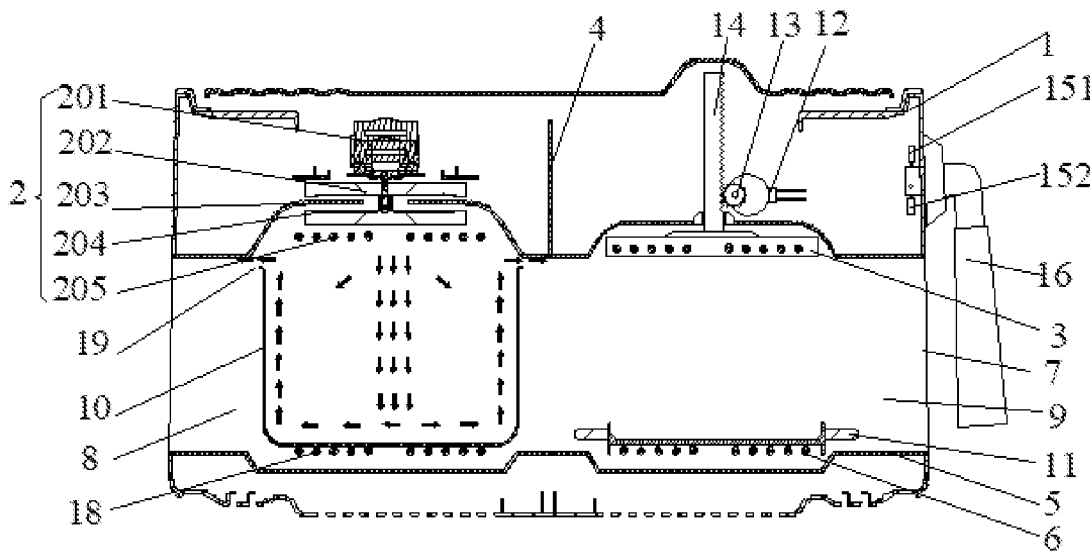
FIG. 2 is a sectional view of the lifting multifunctional air fryer when the first heating element of the example of the present disclosure is raised to the highest point.
Figure 3:
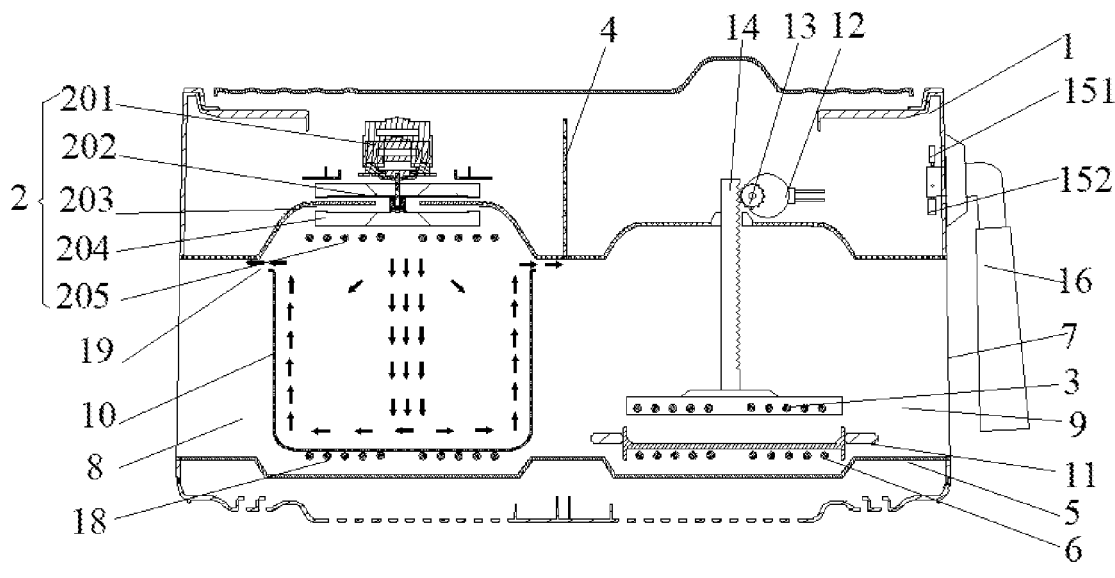
FIG. 3 is a sectional view of the lifting multifunctional air fryer when the first heating element of the example of the present disclosure is lowered to the lowest point.

In an optional embodiment, referring to FIG. 2 and FIG. 3, the lifting drive component includes a drive motor 12, a gear 13 sleeved on the output shaft of the drive motor 12 and a rack 14 meshed with the gear 13. The rack 14 is arranged vertically and connected with the first heating element 3. In this embodiment, the drive motor 12, the gear 13 and the rack 14 are all mounted on a bracket, the bracket is provided with a guide rail groove, and the rack 14 moves up and down in the guide rail groove. The first heating element 3 is fixedly connected to the lower end of rack 14. When working, the drive motor 12 rotates to actuate the gear 13 to rotate, and the rotation of gear 13 drives the rack 14 to move linearly, and further drives the first heating element 3 to move up and down. By controlling the rotation direction of the drive motor 12, the first heating element 3 is switched between ascending and descending, and the height of the first heating element 3 from the second heating element 6 is controlled by the rotation time of the motor. For example, if the height of the first heating element 3 needs to be lowered so that it contacts the surface of the food, the drive motor 12 is controlled to rotate forward, and when the height of the first heating element 3 needs to be raised, the drive motor 12 is controlled to rotate in reverse. In this embodiment, the transmission mechanism with gear 13 and the rack 14 is used to convert the circular motion of the drive motor 12 into linear motion, which has a simple structure and strong practicability. It should be noted that, for this embodiment, the lifting drive component for driving the first heating element 3 to lift is not limited to the scheme of this embodiment, and the lifting structure formed by the cooperation of the gear 13 and the rack 14 can be replaced by a cooperating structure of nut and screw.

In an optional embodiment, the first heating element 3 is a heating plate, and the heating plate includes a plate body and an electrical heated tube arranged in the plate body. The electrical heated tube is spirally wound in the plate body and the heat generated by the electrical heated tube is transferred to the food through the plate body to heat the food. Certainly, the second heating element 6 can also be composed of a heating tube and a frying plate arranged under the heating tube. In this embodiment, when the food is fried by the heating plate, the heating plate can transfer heat to the ingredients evenly, making the food more delicious. The heating plate is used as the second heating element 6, which has a simple structure, and is easy to assemble and clean.

Figure 4:
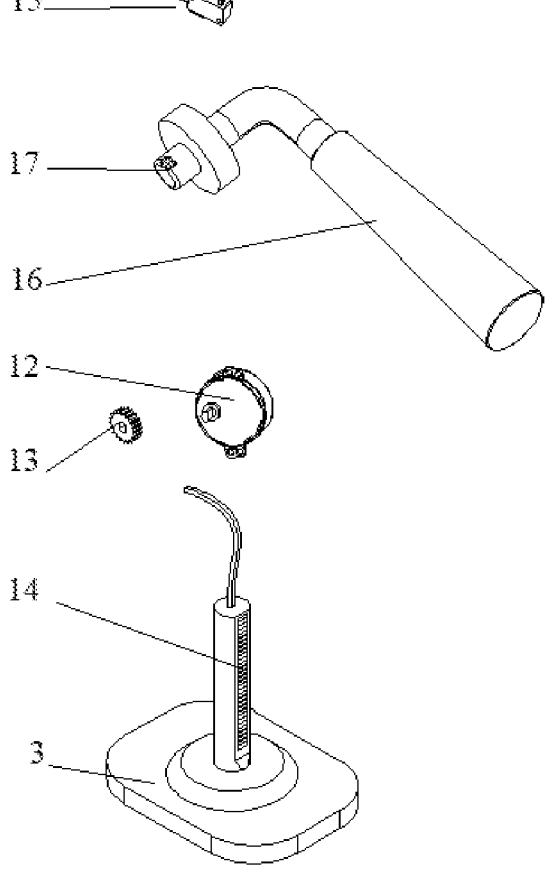
FIG. 4 is a partially exploded view drawing of the lifting multifunctional air fryer according to the example of the present disclosure.

In an optional embodiment, referring to FIG. 2 to FIG. 4, the air fryer further comprises a safety switch 15 and a controller disposed in the machine body, and a rotary handle 16 rotatably connected to the machine body, wherein the safety switch 15 includes an ascending switch 151 and a descending switch 152. The inner end of the rotary handle 16 is provided with a trigger part 17. The trigger part 17 is linked with the safety switch 15. The safety switch 15 is electrically connected with the controller and the drive motor 12. The rotary handle 16 is rotated with at least a first position and a second position. When the rotary handle 16 is rotated to the first position, the trigger part 17 triggers the ascending switch 151 to control the first heating element 3 to rise, and when the rotary handle 16 is rotated to the second position, the trigger part 17 triggers the descending switch 152 to control the first heating element 3 to go down. Specifically, both the ascending switch 151 and the descending switch 152 are micro switches, and the trigger part 17 is a contact block arranged at the inner end of the rotary handle 16. When external force is applied to the rotary handle 16 to make it rotate, the contact block triggers the safety switch 15, and the rotating direction of the rotary handle 16 toward the ascending switch 151 is opposite to that of the rotary handle 16 toward the descending switch 152. When the rotary handle 16 rotates forward to the first position, the contact block triggers the descending switch 152, and the controller controls the drive motor 12 to rotate forward, so as to lower the first heating element 3; after the external force is removed, the motor stops acting, and the first heating element 3 stays on the surface of food. When the rotary handle 16 is reversely rotated to the second position, the contact block triggers the ascending switch 151, and the controller controls the motor to rotate reversely, so that the first heating element 3 rises, the first heating element 3 moves away from the food surface, and the food can be taken out. In the present disclosure, using the rotating handle 16 to control the lifting of the first heating element 3 makes the operation simple and convenient. It can be operated by the elderly and children, and still assure high safety, which achieves good user experience.

In an optional embodiment, the rack 14 is provided with a limiting part. For example, a stopper can be provided at the top of the rack 14 to restrain the movement of the rack 14 within a controllable range, and prevent the rack 14 from being disengaged with the gear 13 when moving up and down.

In an optional embodiment, referring to FIG. 2 and FIG. 3, the base 5 is provided therein with a third heating element 18, and the third heating element 18 is located below the first cooking chamber 8 and is arranged correspondingly to the bottom of the frying basket 10. In this embodiment, the third heating element 18 is selected from any one of heating plate, heating tube, coil disk, and heating film. The third heating element 18 is set correspondingly to the air frying module 2. On the one hand, it can improve the hot air circulation in the frying basket 10 and increase the heating efficiency, thereby allowing the food to be heated more evenly; on the other hand, it can extend the working mode of the air fryer, such as frying and steaming different ingredients at the same time.

Figure 5:
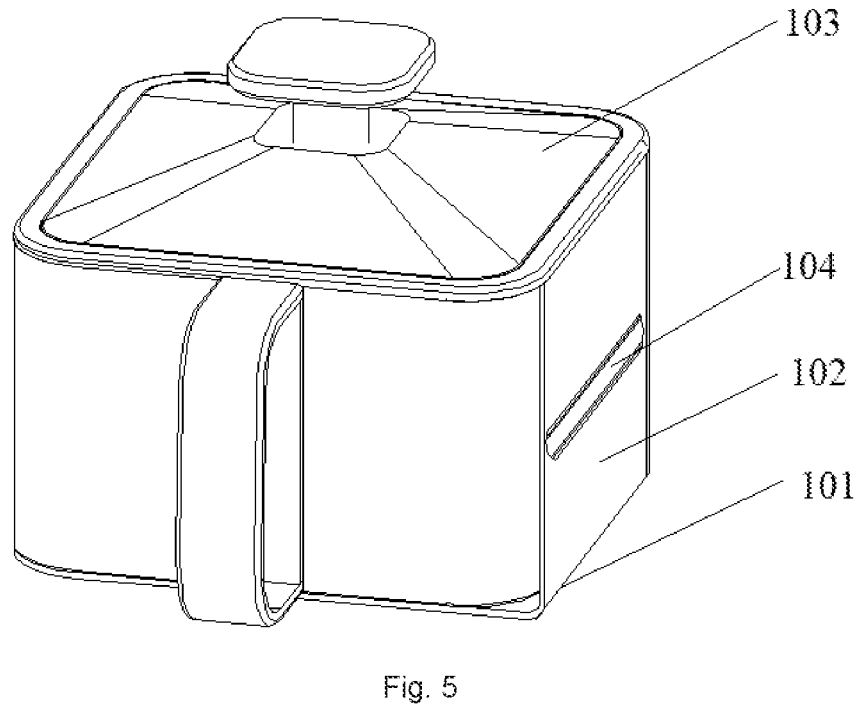
FIG. 5 is a schematic structural view of the frying basket of the embodiment of the present disclosure.

In an optional embodiment, referring to FIG. 1 and FIG. 5, the frying basket 10 includes a bottom plate 101 and a vertical plate 102 arranged around the bottom plate 101, wherein the bottom plate 101 and the vertical plate 102 are integrally formed to form a receiving chamber with an open top. When the frying basket 10 is placed inside the first cooking chamber 8, part region of the vertical plate 102 is surrounded by the side plate 7, and the remaining region is directly exposed to the external environment. In this embodiment, the frying basket 10 is directly communicated to the external environment, and the side wall of the frying basket 10 has no cold air circulation structure such as a lower core and a shell. On the one hand, the material cost and the assembly cost of the frying basket 10 are saved, reducing the production cost of the air fryer; on the other hand, it is convenient to clean the machine head 1 and the frying basket 10.

In an optional embodiment, referring to FIG. 1, the projected length of the side plate 7 on the base 5 is not greater than half of the perimeter of the base 5. When the frying basket 10 is placed below the air frying module 2, a small part of region of the frying basket 10 is located in an enclosing region formed by the machine head 1, the base 5 and the side plate 7, and most of the region is located outside the enclosing region, that is, most part of the region of the vertical plate 102 is exposed outside, only a small part is surrounded by the side plate 7. In the present disclosure, the cookware can enter and exit the first cooking chamber and the second cooking chamber at various angles from the side surfaces of the air fryer, and is not limited to the prior art that it can only be put in from the front, which improves the user experience and aesthetics of the air fryer. At the same time, since most part of the vertical plate 102 is exposed outside, the heat dissipating effect of the frying basket 10 is improved.

In an optional embodiment, referring to FIG. 2 and FIG. 3, when the frying basket 10 is placed in the first cooking chamber 8, there are steam outlets 19 between the vertical plate 102 and the machine head 1. In this embodiment, there is a gap between the top of the vertical plate 102 and the air frying module 2, forming steam outlets 19, through which excess heat in the receiving chamber is discharged. Since there are steam outlets 19 set and is no need to form holes on the side wall of the air fryer, the structure of the air fryer is simplified and the aesthetics of the air fryer is improved.

In an optional embodiment, referring to FIG. 5, the frying basket further includes a pot lid 103 covering the top of the vertical plate 102, the inner wall of the vertical plate 101 is provided with a step surface 104, and the step surface 104 is selectively equipped with a steaming plate or a frying plate. In this embodiment, the frying basket 10 can not only fry food, but also can steam food, which can be used for multiple purposes, and has very good practicability.

It should be noted that the terminology herein is only used for the purpose of describing specific embodiments, but not to limit the exemplary embodiments according to the present disclosure. As used herein, unless it is clearly dictated in the context, the singular is intended to include the plural, and it should also be understood that when the terms "contain" and/or "include" are used in this specification, they indicate that the features, steps, operations, means, components and/or combinations thereof exist.

The relative arrangements of components and steps, numerical expressions and numerical values set forth in these embodiments do not limit the scope of the present disclosure unless specifically stated otherwise. At the same time, it should be understood that, for the convenience of description, the sizes of the various parts shown in the drawings are not drawn according to the actual proportional relationship. Techniques, methods and devices known to those of ordinary skill in the relevant art may be discussed not in detail, but in appropriate cases, such techniques, methods and devices should be considered part of the patent grant. In all examples shown and discussed herein, any specific values should be construed as exemplary only, but not as limitations. Therefore, other examples of the exemplary embodiment may have different values. It should be noted that similar numerals and letters refer to similar items in the following figures, therefore, once a certain item is defined in one figure, it does not require further discussion in subsequent figures.

In the description of the present disclosure, it should be understood that orientation words such as "front, back, up, down, left, right", "transverse, upright, vertical, horizontal" and "top, bottom" and so on indicate the orientation or positional relationship generally based on the orientation or positional relationship shown in the drawings, and is only for the convenience of describing the present disclosure and simplifying the description. In the absence of a contrary statement, these orientation words do not indicate or imply the referred device or elements must be in a specific orientation or be constructed and operated in a specific orientation, so they cannot be construed as limiting the protection scope of the present disclosure, and the orientation words "inside, outside" refer to the inside and outside relative to the outline of each component itself.

To allow for description, terms relating to space may be used here, such as "on . . . ", "over . . . ", "on the upper surface of . . . ", "above", etc., to describe the spatial location relationship between one device or feature and other devices or features as shown in the drawings. It should be understood that the spatially relative terms are intended to encompass different orientations when using or operating the device besides the orientation depicted in the figures. For example, if the device in the figures is turned over, the device described as "above other devices or configurations" or "over other devices or configurations" would then be oriented as "under other devices or configurations" or "below other devices or configurations". Thus, the exemplary term "above . . . " can encompass both orientations of "above . . . " and "below . . . ". The device may be otherwise oriented (rotated by 90 degrees or at other orientations) and the spatially relative descriptions used herein may be interpreted accordingly.

In addition, it should be noted that the use of words such as "first" and "second" to define components is only for the convenience of distinguishing corresponding components. If there is no other statement, the above words have no special meaning, and therefore cannot be interpreted as limiting the protection scope of the present disclosure.

The lifting multifunctional air fryer provided by the present disclosure has been introduced in detail above. In the present disclosure, specific examples are used to illustrate the principle and embodiment of the present disclosure. The description of the above embodiments only helps understanding the method and its core idea of the present disclosure. At the same time, for those of ordinary skill in the art, based on the idea of the present disclosure, there will be changes in the specific embodiment and scope of application. In summary, the content of this specification should not be understood as limitation of the present disclosure.

What is claimed is:

1. A lifting multifunctional air fryer, wherein the air fryer comprises:

a cookware, comprising a frying basket and a frying pan;

a machine body, comprising a machine head, a base and a side plate, wherein the side plate is arranged between the machine head and the base, and defines a first cooking chamber for accommodating the frying basket and a second cooking chamber for accommodating the frying pan, above the first cooking chamber is provided with an air frying module, the air frying module communicates with an inner chamber of the frying basket, a first heating element is arranged above the second cooking chamber, and a second heating element is arranged below the second cooking chamber, and both the first heating element and the second heating element are connected to the frying pan; and a lifting drive component, configured to actuate the first heating element to carry out lifting movement, so that a height between the first heating element and the second heating element matches a height of an ingredient on the frying pan.

2. The lifting multifunctional air fryer according to claim 1, wherein the first heating element is a heating plate, and the heating plate comprises a plate body and electrical heated tubes arranged in the plate body.

3. The lifting multifunctional air fryer according to claim 2, wherein the lifting drive component comprises a drive motor, a gear sleeved on an output shaft of the drive motor and a rack meshing with the gear, wherein the rack is arranged vertically and connected with the first heating element.

4. The lifting multifunctional air fryer according to claim 3, wherein the air fryer further comprises:

a safety switch, arranged in the machine head, and comprising an ascending switch and a descending switch;

a rotary handle, which is rotatably connected to the machine head, wherein an inner end of the rotary handle is provided with a trigger part, and the trigger part is in linkage with the safety switch; and a controller, arranged in the machine head, and electrically connected with the safety switch and the drive motor, wherein the rotary handle is rotated between a first position and a second position, and when the rotary handle is rotated to the first position, the trigger part triggers the ascending switch to control the first heating element to rise, and when the rotary handle is rotated to the second position, the trigger part triggers the descending switch to control the first heating element to descend.

5. The lifting multifunctional air fryer according to claim 3, wherein the rack is provided with a limiting part.

6. The lifting multifunctional air fryer according to claim 1, wherein a third heating element is arranged in the base, and the third heating element is located below the first cooking chamber and is arranged correspondingly to a bottom of the frying basket.

7. The lifting multifunctional air fryer according to claim 1, wherein the frying basket comprises a bottom plate and a vertical plate arranged around the bottom plate, wherein the bottom plate and the vertical plate are integrally formed to form a receiving chamber with an open top, when the frying basket is placed in the first cooking chamber, a partial region of the vertical plate is surrounded by the side plate, and a remaining region from the partial region is directly exposed to an external environment.

8. The lifting multifunctional air fryer according to claim 7, wherein a projected length of the side plate on the base is not greater than half of a perimeter of the base.

9. The lifting multifunctional air fryer according to claim 8, wherein when the frying basket is placed in the first cooking chamber, steam outlets are provided between the vertical plate and the machine head.

10. The lifting multifunctional air fryer according to claim 8, wherein the frying basket further comprises a pot lid covering a top of the vertical plate, and an inner wall of the vertical plate is provided with a step surface, and the step surface is equipped with a steaming plate or a frying plate.

11. The lifting multifunctional air fryer according to claim 2, wherein the frying basket comprises a bottom plate and a vertical plate arranged around the bottom plate, wherein the bottom plate and the vertical plate are integrally formed to form a receiving chamber with an open top, when the frying basket is placed in the first cooking chamber, a partial region of the vertical plate is surrounded by the side plate, and a remaining region from the partial region is directly exposed to an external environment.

12. The lifting multifunctional air fryer according to claim 3, wherein the frying basket comprises a bottom plate and a vertical plate arranged around the bottom plate, wherein the bottom plate and the vertical plate are integrally formed to form a receiving chamber with an open top, when the frying basket is placed in the first cooking chamber, a partial region of the vertical plate is surrounded by the side plate, and a remaining region from the partial region is directly exposed to an external environment.

13. The lifting multifunctional air fryer according to claim 4, wherein the frying basket comprises a bottom plate and a vertical plate arranged around the bottom plate, wherein the bottom plate and the vertical plate are integrally formed to form a receiving chamber with an open top, when the frying basket is placed in the first cooking chamber, a partial region of the vertical plate is surrounded by the side plate, and a remaining region from the partial region is directly exposed to an external environment.

14. The lifting multifunctional air fryer according to claim 5, wherein the frying basket comprises a bottom plate and a vertical plate arranged around the bottom plate, wherein the bottom plate and the vertical plate are integrally formed to form a receiving chamber with an open top, when the frying basket is placed in the first cooking chamber, a partial region of the vertical plate is surrounded by the side plate, and a remaining region from the partial region is directly exposed to an external environment.

15. The lifting multifunctional air fryer according to claim 6, wherein the frying basket comprises a bottom plate and a vertical plate arranged around the bottom plate, wherein the bottom plate and the vertical plate are integrally formed to form a receiving chamber with an open top, when the frying basket is placed in the first cooking chamber, a partial region of the vertical plate is surrounded by the side plate, and a remaining region from the partial region is directly exposed to an external environment.

* * * * *